Patented Jan. 12, 1932

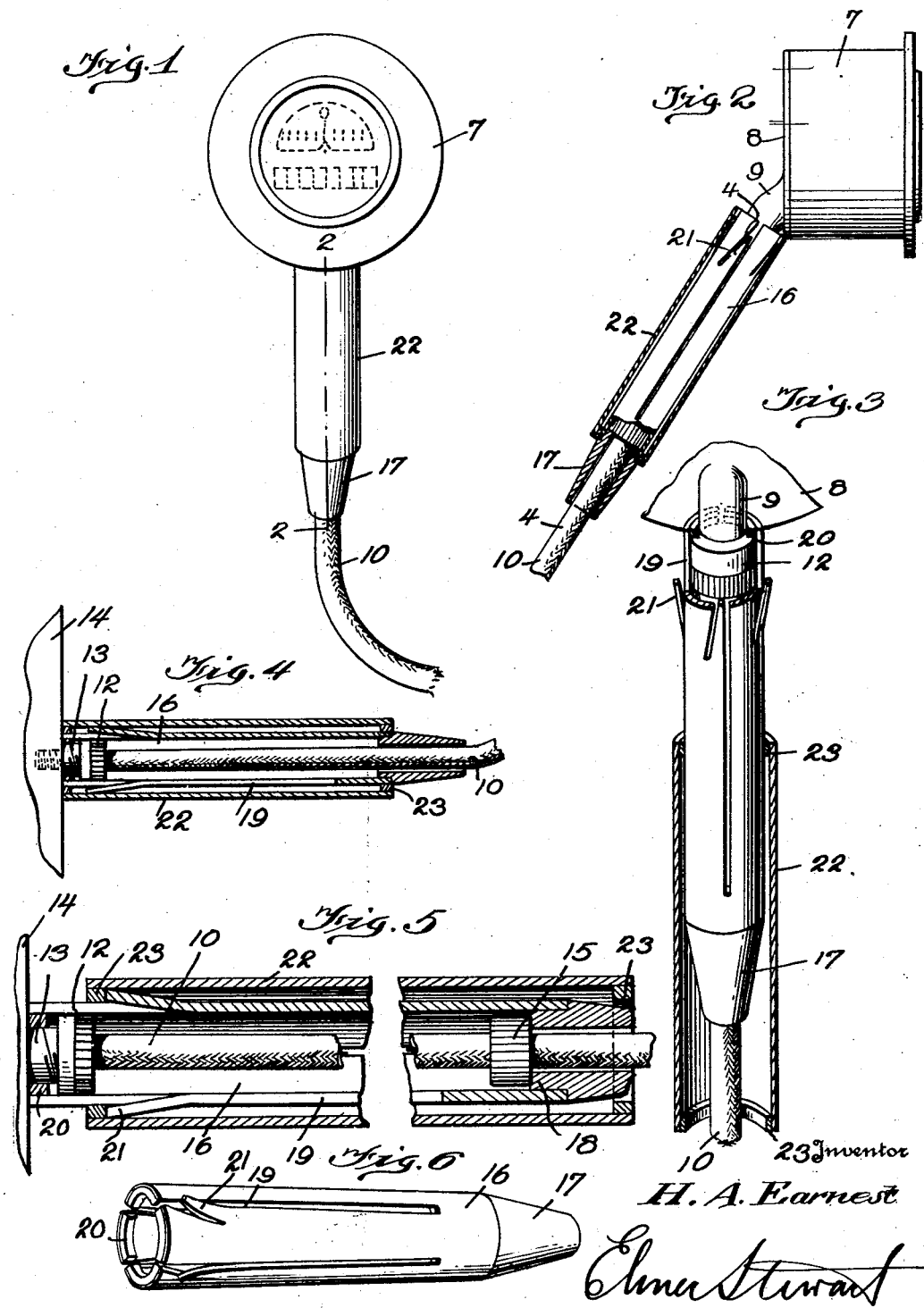

1,841,319

UNITED STATES PATENT OFFICE

HARRY A. EARNEST, OF LANCASTER, PENNSYLVANIA

LOCKING DEVICE FOR COUPLINGS

Application filed July 22, 1930. Serial No. 469,908.

This invention relates to locking devices for couplings and provides novel and improved means to prevent unauthorized access to the coupling or fastening between machine parts. By way solely of example I have illustrated this invention as applied to the coupling of the armored tubing of the flexible shaft in speedometer drives. This is one of numerous instances where it is desired to prevent the accidental or unauthorized disconnection of machine parts. Flexible drives of this type are used for speedometers and other registering devices for accurate measurement of speed, numbers of revolution or like operations. In the hiring of automobile vehicles or the operation of machine tools such a register is of importance in determining travel or work done and any tampering or disconnection of the coupling seriously affects the reliability of the register. By my device it is possible to conceal and protect a coupling against disconnection or injury and thus insure the accurate registration of the machine.

The preferred embodiment of my improvement is illustrated in the accompanying drawings in which:

Fig. 1 is a front elevation of a speedometer including my improved locking device;

Fig. 2 is a side elevation partly in section on the line 2, 2 of Fig. 1;

Fig. 3 is a perspective view partly in elevation;

Fig. 4 is a longitudinal section on the line 4, 4 of Fig. 2;

Fig. 5 is a similar longitudinal section on an enlarged scale, and

Fig. 6 is a perspective view of the fastening sleeve.

A speedometer casing 7 is illustrated of conventional form and includes the back 8 from which extends a tubular fitting 9. This fitting is screw threaded for connection with the armored tubing of the speedometer drive. The armored tubing 10 of the speedometer drive is of the usual type which has a limited flexibility, and is protected against wear or breaking. Each end of the tubing 10 has a collar which forms part of a union or fitting between the tubing and the machine parts by which the latter is held. Each collar carries a knurled nut 12 which may be readily rotated with respect to the collar and tubing, drawing the collar into tight engagement with the screw threaded fitting. The knurled nut 12 is used to attach the tubing firmly to the screw threaded fitting 9 of the speedometer casing while the knurled nut 12 at the opposite end of the tubing brings the collar into tight engagement with the screw threaded fitting 13. Fitting 13 forms the connection of the tubing 10 to the housing 14 of the machine parts. Usually in present day practice this housing 14 is part of the transmission case of an automobile or the like. By this means the flexible shaft contained within the armored tubing 10 is held in driving connection between the speedometer and whatever rotating part is being used to indicate speed or number of revolutions. This connection is of course the one usually found in practice.

In order to insure the permanence of the connection above described I have provided a locking device which is readily assembled with the above parts. Spaced from each end of the armored tubing I attach a stop 15 which is in the form of a ring or collar brazed or otherwise fastened to the tubing. A fastening sleeve 16 is formed of tubular material one end of which is tapered at 17 to have a sliding fit closely around the tubing. The sleeve 16 is of such an internal diameter as will slide readily over stop 15 and the knurled nut 12. The tapered end 17 has an abutting face 18 which strikes the collar 15 and limits movement of the sleeve over the end of the coupling.

The opposite end of sleeve 16 is slotted as at 19 longitudinally for a considerable distance along the sleeve in order to obtain the desired resilience permitting this end of the sleeve to expand to a small degree. This end of the sleeve also carries an interrupted internal flange 20 which forms an abutment fitting closely around the fitting 13 and against the end of the knurled nut 12 when the sleeve is pulled away from the housing 14 or the fitting 9 as the case may be.

Spring fingers 21 are cut in the sides of the sleeve 16 at any desired point along the length of slots 19 and these spring fingers are expanded slightly above the outer surface of the sleeve.

The locking collar 22 is provided of slightly less length than the sleeve 16 and of slightly greater diameter. The collar is reversible in that each end carries an internal flange 23 which reduces the internal diameter at the ends to slightly more than that of the outer diameter of the sleeve. In position these internal flanges 23, 23 rest upon the sleeve 16 and the flange over the knurled nut 12 forms an abutment for the spring fingers 21.

The mode of operation of the above device will be readily apparent from the drawings. The device is assembled on the flexible tubing by sliding the lock collar over one end of the tubing. The fastening sleeve 16 is then drawn over the knurled nut 12. In order to accomplish this the tapered end 17 may be proportioned with an internal diameter greater than the diameter of the nut 12 and subsequently swaged or otherwise reduced in diameter. The stop 15 is then applied to the tubing at the desired distance from the end. With the sleeve drawn back from the end, the knurled nut 12 may then be fastened to the fitting 9 or 13. The sleeve is then sprung over the knurled nut 12 against the end of which the flange 20 abuts. The locking collar 22 is caused to slide over the sleeve 16 until one flange 23 passes beyond the spring fingers 21.

The result is that the locking collar 22 prevents any further expansion of the slotted end of the sleeve 16. Therefore the flanges 20 are held in abutting relation to the knurled nut, concealing the latter and preventing any unauthorized disconnection of the tubing at this point.

It will be observed that in the above manner I have provided for the permanent locking of a connected coupling wherever it may be desired to accomplish this result. While I have illustrated and described the preferred form of my invention still the same is subject to variation in design and structural details without departing from the scope of the invention as set out in the following claims.

What I claim is:

1. In combination, a tubing having an end collar, a connecting nut on the collar, a fastening sleeve slidable over said nut, an internal flange at the end of the sleeve, a locking collar slidable over the end of the sleeve and means preventing retraction of the locking collar.

2. In combination, a tubing having an end collar, a connecting nut on the collar, a fastening sleeve slidable over said nut, an internal flange at the end of the sleeve beyond the nut, a locking collar slidable over the end of the sleeve and resilient means preventing retraction of the locking collar.

3. In combination, a tubing having an end collar, a connecting nut on the collar, a fastening sleeve, an internal flange at the end of the sleeve, said sleeve being capable of expansion to receive the nut interiorly of said flange, a locking collar slidable over the sleeve and means preventing retraction of the locking sleeve.

4. In combination, a tubing having an end collar, a connecting nut on the collar, a fastening sleeve having a longitudinally slotted end, an internal flange within said end and abutting said nut, outwardly extending spring fingers on said sleeve, a locking collar slidable over the sleeve and means on said locking collar to engage said spring fingers.

5. In combination, a tubing having an end collar, a connecting nut on the collar, a fastening sleeve slidable over said nut, a stop on the tubing to limit the movement of the sleeve, means on the sleeve engaging the nut to prevent retraction of the sleeve, and means carried by the sleeve to prevent separation of the nut and sleeve.

6. In combination, a tubing having an end collar, a connecting nut on the collar, a sleeve having an expansible end with an internal flange engaging the end of the nut, a collar slidable over the sleeve, an internal flange on the collar for preventing expansion of the end of the sleeve and means for preventing the retraction of the collar.

7. In combination, a tubing having an end collar, a connecting nut on the collar, a sleeve having an expansible end with an internal projection engaging the end of the nut, a collar slidable over the sleeve, an internal flange on the collar for preventing expansion of the end of the sleeve and means on the sleeve for limiting the retraction of the flange.

8. In combination, a tubing having a coupling fitting at one end, a sleeve loosely carried on the tubing, means for limiting the movement of the sleeve toward said end of the tubing, said sleeve being deformable at one end, means interiorly of said deformable end to rest against the coupling fitting and prevent retraction of the sleeve, a locking collar loosely slidable over the sleeve, an internal flange at each end of the sleeve and fitting closely around said sleeve and means on the sleeve for locking against one of said internal flanges.

In testimony whereof, I have affixed my signature.

HARRY A. EARNEST.